US007259668B2

(12) United States Patent
    Casey

(10) Patent No.: US 7,259,668 B2
(45) Date of Patent: Aug. 21, 2007

(54) MAPPING THE LOCATION OF A MOBILE COMMUNICATIONS DEVICE SYSTEMS AND METHODS

(75) Inventor: Steven M Casey, Littleton, CO (US)

(73) Assignee: Qwest Communications International Inc., Denver, CO (US)

( * ) Notice: Subject to any disclaimer, the term of this patent is extended or adjusted under 35 U.S.C. 154(b) by 206 days.

(21) Appl. No.: 11/180,055

(22) Filed: Jul. 12, 2005

(65) Prior Publication Data

US 2007/0013560 A1     Jan. 18, 2007

(51) Int. Cl.
    *G08B 1/08*     (2006.01)
    *H04Q 7/00*     (2006.01)
(52) U.S. Cl. .............. 340/539.13; 340/455; 340/539.2; 340/995.19; 455/456.3
(58) Field of Classification Search ........... 340/539.13, 340/539.19, 955.19, 455; 455/456.1, 456.6, 455/457, 414.1, 414.2
    See application file for complete search history.

(56) References Cited

U.S. PATENT DOCUMENTS

| 5,552,772 | A  | * | 9/1996  | Janky et al. ............ 340/573.4 |
| 5,699,255 | A  | * | 12/1997 | Ellis et al. ............... 701/212 |
| 6,055,510 | A  |   | 4/2000  | Henrick et al. |
| 6,115,611 | A  |   | 9/2000  | Kimoto et al. |
| 6,122,520 | A  |   | 9/2000  | Want et al. |
| 6,202,023 | B1 |   | 3/2001  | Hancock et al. |
| 6,236,358 | B1 |   | 5/2001  | Durst et al. |
| 6,243,039 | B1 |   | 6/2001  | Elliot |
| 6,292,747 | B1 |   | 9/2001  | Amro et al. |
| 6,317,718 | B1 |   | 11/2001 | Fano |
| 6,321,091 | B1 |   | 11/2001 | Holland |
| 6,456,854 | B1 |   | 9/2002  | Chern et al. |
| 6,594,483 | B2 |   | 7/2003  | Nykanen et al. |
| 6,615,130 | B2 |   | 9/2003  | Myr |
| 6,618,593 | B1 | * | 9/2003  | Drutman et al. ......... 455/456.3 |
| 6,650,902 | B1 | * | 11/2003 | Richton ................... 455/456.3 |
| 6,665,534 | B1 |   | 12/2003 | Conklin et al. |
| 6,757,544 | B2 | * | 6/2004  | Rangarajan et al. ..... 455/456.1 |
| 6,762,684 | B1 |   | 7/2004  | Camhi |
| 6,823,189 | B2 |   | 11/2004 | Akhteruzzaman et al. |
| 6,839,628 | B1 | * | 1/2005  | Tu ............................ 701/209 |
| 6,850,839 | B1 |   | 2/2005  | McGibney |
| 6,867,733 | B2 | * | 3/2005  | Sandhu et al. ......... 342/357.07 |

(Continued)

*Primary Examiner*—Jeffery Hofsass
*Assistant Examiner*—Hoi C. Lau
(74) *Attorney, Agent, or Firm*—Townsend and Townsend and Crew LLP

(57) ABSTRACT

Embodiments of the invention comprise systems and methods related to the provision of location based services via a mobile communications device. In different embodiments, a communication system is described, comprising a mobile communications device, a mobile communications base station, and a server computer system. The location of the device may be correlated with certain user preferences stored on the server computer system. In various embodiments, components of the larger system are described. In some cases, various location related mapping functions for a device are discussed. In other embodiments, systems and methods which provide for activities to be undertaken based on the location of a device are described. In still other embodiments, the disclosure addresses systems and methods of efficiently determining the location of a mobile device. In some embodiments, different notification schemes based on the location of a device and specified preferences are described. In various other embodiments, the disclosure addresses systems and methods for keyword monitoring based on the location of a device.

25 Claims, 8 Drawing Sheets

U.S. PATENT DOCUMENTS

| | | |
|---|---|---|
| 6,867,773 B2 | 3/2005 | Hux |
| 6,888,495 B2 | 5/2005 | Flick |
| 6,889,135 B2 | 5/2005 | Curatolo et al. |
| 6,895,332 B2* | 5/2005 | King et al. .................. 701/213 |
| 6,944,447 B2 | 9/2005 | Portman et al. |
| 7,007,228 B1* | 2/2006 | Carro ......................... 715/513 |
| 7,047,019 B1 | 5/2006 | Cox et al. |
| 2001/0027378 A1 | 10/2001 | Tennison et al. |
| 2001/0032236 A1 | 10/2001 | Lin |
| 2002/0034954 A1* | 3/2002 | Nohara et al. .............. 455/456 |
| 2002/0132627 A1 | 9/2002 | Ichihara |
| 2002/0143930 A1 | 10/2002 | Babu et al. |
| 2002/0160745 A1 | 10/2002 | Wang |
| 2003/0003909 A1 | 1/2003 | Keronen et al. |
| 2003/0013462 A1 | 1/2003 | Adachi |
| 2003/0016804 A1 | 1/2003 | Sheha et al. |
| 2003/0201931 A1 | 10/2003 | Durst et al. |
| 2004/0000994 A1* | 1/2004 | Kuo ...................... 340/539.13 |
| 2004/0048620 A1* | 3/2004 | Nakahara et al. ........ 455/456.1 |
| 2004/0092253 A1 | 5/2004 | Simonds et al. |
| 2004/0093157 A1 | 5/2004 | Muller et al. |
| 2004/0127203 A1 | 7/2004 | Markki et al. |
| 2004/0246147 A1 | 12/2004 | von Grabe |
| 2004/0248588 A1* | 12/2004 | Pell et al. ................. 455/456.1 |
| 2005/0159142 A1 | 7/2005 | Giniger et al. |
| 2005/0170872 A1* | 8/2005 | Vuori et al. ............. 455/575.8 |
| 2005/0278371 A1 | 12/2005 | Funk et al. |

\* cited by examiner

MAPPING THE LOCATION OF A MOBILE COMMUNICATIONS DEVICE SYSTEMS AND METHODS

CROSS-REFERENCES TO RELATED APPLICATIONS

This Application is related to the following U.S. patent applications, the entire disclosures of which are hereby incorporated by reference: U.S. application Ser. No. 11/180,094, filed on a date even herewith by Casey, entitled "Efficiently Determining the Location of a Mobile Communications Device Systems and Methods"; U.S. application Ser. No. 11/180,110, filed on a date even herewith by Casey, entitled "Correlating Activities with the Location of a Mobile Communications Device Systems And Methods"; U.S. application Ser. No. 11/180,114, filed on a date even herewith by Casey, entitled "User Defined Location Based Notification for a Mobile Communications Device Systems And Methods"; and U.S. application Ser. No. 11/180,116, filed on a date even herewith by Casey, entitled "Location Related Keyword Monitoring on a Mobile Communications Device Systems and Methods".

COPYRIGHT NOTICE

A portion of the disclosure of this patent document contains material which is subject to copyright or mask work protection. The copyright or mask work owner has no objection to the facsimile reproduction by anyone of the patent document or the patent disclosure, as it appears in the Patent and Trademark Office patent file or records, but otherwise reserves all copyright or mask work rights whatsoever.

BACKGROUND OF THE INVENTION

Embodiments of the invention generally relate to mobile communications devices and wireless networking. More specifically, they relate to systems and methods for efficiently determining location information of mobile communications devices.

GPS chipsets and other location determination technology have advanced rapidly over past few years. Technology related to mobile communications devices, and the networks upon which they operate, have seen breakthroughs as well. Relational databases and computers systems represent another area that has also seen significant advancement. There are significant opportunities for integration of these different systems, devices and technologies to provide new functionality.

One of the larger hurdles to deployment is the power constraints inherent in many mobile communications devices. This limits the processing that can take place on the devices, and thus limits their functionality. Many services that leverage location information are power intensive on the device, and thus have not been deployed in many types of devices. For example, mapping software, which creates maps based on GPS location information, is often loaded on to mobile devices. However, this type of functionality requires significant processing, and thus serves as a significant drain on many mobile communication devices. Thus, there exists a need in the art to leverage these advanced technologies, while efficiently using the limited power available on a device.

In addition to providing location based information only to the user, the sharing of location based information may provide benefits. Given privacy concerns, users will not want to share their location information all of the time and to everyone. These privacy concerns are an impediment that currently limits the sharing of such information. However, there are specific instances in which sharing location information is of significant value. For instance, letting friends and other family members know a user's location can be important for safety and coordination reasons. Also, sharing information with certain providers of products and services in user defined circumstances may provide value as well. Thus, there exists a need in the art for systems and methods of sharing location based and other user information, while filtering access to that information.

BRIEF SUMMARY OF THE INVENTION

Embodiments of the invention provide systems and methods for mapping the location of a mobile communications device. According to some embodiments, a mobile communications device is configured to receive a set of data identifying the location of the device, and transmit the set of data. The device may be configured to receive image data illustrating a map and the location of the device, and display the image data on a screen.

According to various embodiments, there is a mobile communications base station in communication with the mobile communications device via a wireless connection. In some embodiments, there is a server computer system in communication with the base station. The server computer system may be configured to maintain a user profile about the user and the device. The server computer system may be configured to receive the set of data identifying the location of the device, associate the set of data with a user and the user profile, and transmit image data formatted according to information in the user profile. In certain embodiments, the selection of data may comprise a map illustrating the location of the device. Various embodiments comprise selected components of the larger communications system.

According to some embodiments, the device is a cellular phone. In some cases, the device may be used to transmit data to modify the user profile. According to various embodiments of the invention, different forms of GPS data comprise the set of data identifying the location of the device. In some embodiments, the user profile includes preferences regarding the display of different types of information. In some instances, the location of businesses and other points of interest will be displayed in the image data. In certain embodiments, the locations may be graphically represented as icons comprising hyperlinks to additional information.

According to various embodiments, the server computer system is further configured to store the set of data identifying the location of the device. The image data may thus include historical representations of the location of the device as well. According to various embodiments, sets of data identifying the location of the device may be from a plurality of devices, and such locations may be displayed. In some embodiments, a second location is specified, and the image data includes the second location and a suggested route to that location. The methods of the present invention may also be embodied in a computer-readable storage medium having a computer-readable program embodied therein.

Further areas of applicability of the present invention will become apparent from the detailed description provided hereinafter. It should be understood that the detailed description and specific examples, while indicating various embodiments of the invention, are intended for purposes of illustration only and are not intended to necessarily limit the scope of the invention.

BRIEF DESCRIPTION OF THE DRAWINGS

A further understanding of the nature and advantages of the present invention may be realized by reference to the following drawings. In the appended figures, similar components or features may have the same reference label.

DETAILED DESCRIPTION OF THE INVENTION

Figure 1:
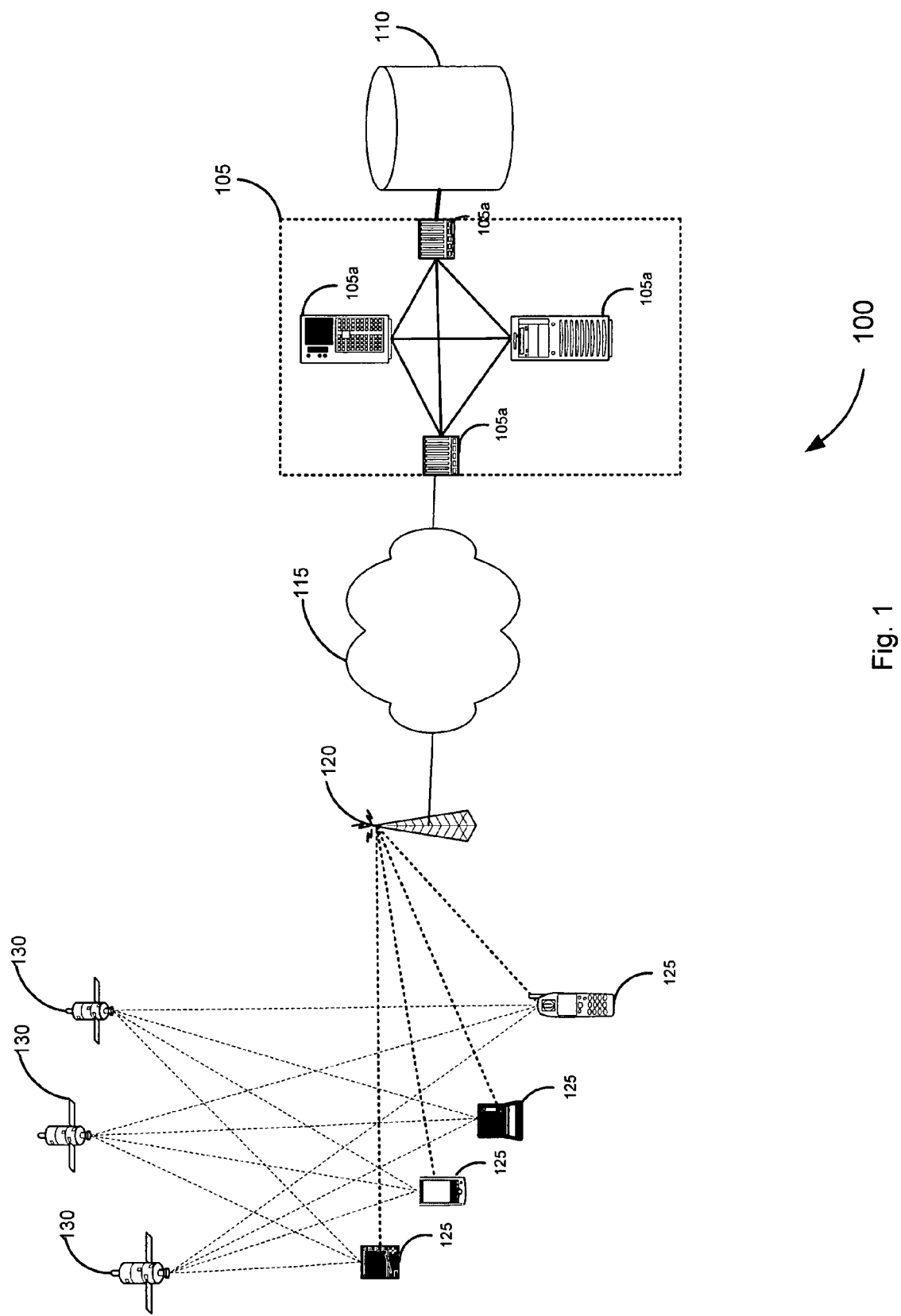
FIG. 1 illustrates a communications system that may be used for providing location based information according to various embodiments of the present invention.

The ensuing description provides preferred exemplary embodiments only, and is not intended to limit the scope, applicability or configuration of the invention. Rather, the ensuing description of the embodiments will provide those skilled in the art with an enabling description for implementing several embodiments of the invention. Various changes may be made in the function and arrangement of elements without departing from the spirit and scope of the invention as set forth in the appended claims.

Specific details are given in the following description to provide a thorough understanding of the described embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figures.

Moreover, as disclosed herein, the terms "storage medium" or "storage media" may represent one or more devices for storing data, including read only memory (ROM), random access memory (RAM), magnetic RAM, core memory, magnetic disk storage mediums, optical storage mediums, flash memory devices or other machine readable mediums for storing information. The term "computer-readable medium" includes, but is not limited to portable or fixed storage devices, optical storage devices, wireless channels and various other mediums capable of storing, containing or carrying instructions or data.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as a storage medium. Processors may perform the necessary tasks. A code segment may represent a procedure, a function, a subprogram, a program, a routine, a subroutine, a module, a software package, a class, or any combination of instructions, data structures, or program statements.

I. Network Infrastructure

Embodiments of the invention generally relate to mobile communications devices and wireless networking. Embodiments of the present invention include a communications system 100, comprised of one or more Mobile Communications Devices 125, a Mobile Communications Base Station 120, and a Server Computer System 105. A description of these elements follows.

The basic configuration 100 of the communications system is depicted in FIG. 1, for purposes of explaining the systems and methods of the present invention. Embodiments of the present invention include a Server Computer System 105, which may include, for example, one or more server computers, personal computers, workstations, web servers, or other suitable computing devices.

The following represents an exemplary structure for one or more of the aforementioned computing devices 105a, which combined make up the Server Computer System 105. A computing device 105a is preferably comprised of hardware elements that are electrically coupled via bus, including a microprocessor, a computer-readable storage media reader, a communications component, and a memory. The storage media reader is further connected to a storage medium, the combination comprehensively representing remote, local, fixed, or removable storage devices or storage media for temporarily or more permanently containing computer-readable information. The communications component may comprise a wired, wireless, modem, or other type of interfacing connection and permits data to be exchanged with other components of the Server Computer System 105, or the Internet, among others.

The Server Computer System 105 also comprises software elements present on the storage media or in memory, which includes an operating system and other code. The Server Computer System 105 includes application software that programs the Server Computer System 105 to perform one or more functions according to the present invention. For example, application software resident on the Server Computer System 105 may be executable by the Server Computer System 105 to receive and analyze location based information from Mobile Communication Devices 125. It will be apparent to those skilled in the art that substantial variations may be implemented in accordance with the specific requirements of the different embodiments.

The Server Computer System 105 may be fully located within a single facility or distributed geographically, in which case a communications network, as described below, may be used to integrate different components of the Server Computer System 105. The communications network ("Network") 115, which may be any combination of the following: the Internet, an intranet, a wide-area network ("WAN"), a local-area network ("LAN"), a virtual private network, the Public Switched Telephone Network ("PSTN"), or any other type of network supporting communication between devices described herein, in different embodiments. The Network 115 may include both wired and wireless connections, including optical links. Many other examples are possible and apparent to those skilled in the art in light of this disclosure.

The Server Computer System 105 may be associated with at least one Database 110. According to different embodiments of the invention, the Database 110 contains information related to location information, authentication information, user profiles and preferences. The Database 110 may include any number of tables and sets of tables. In addition, the databases described below may be included in the Database 110. Application software running on the Server Computer System 105 queries the Database 110, and produces forms, reports, or other output as dictated by the application software. The Database 110 may be incorporated within the Server Computer System 105 (e.g. within its storage media), or may be a part of a separate system associated with the Server Computer System 105. The Database 110 may be fully located within a single facility or distributed geographically. The Database 110 may be organized in any manner different than described above to provide the functionality called for by the various embodiments, as known by those skilled in the art.

According to various embodiments, the Database 110 includes an electronic map database, providing data related to streets, buildings, malls, parks, lakes, rivers, mountains, and other related geographic and topographic information. This information may be configured to be correlated against coordinates that are produced with location based information received by the Server Computer System 105, such as the GPS location based information described below. Size, shape, location, and name information related to the locations may thereby be associated with certain coordinates. Tables may be comprised of data on large geographic areas, such as countries, states, and counties. Tables may also be comprised of smaller geographic areas, such as urban areas, cities, communities, and the like. Tables may include street names, address numbers and ranges, street class and type, speed limits, and supplemental attributes. Different sizes, shapes, colors, dots, icons, and fonts may be used to indicate different features. The electronic map database may be configured to determine destinations, distances, or directions for navigation purposes. The electronic map database may also contain a number of "logical location" mappings, wherein different locations are associated with businesses and other points of interest situated in those locations. The content of the electronic map database may include any combination of the aforementioned attributes and information. The design and organization of the aforementioned tables is discretionary and within the skill of those of ordinary skill in the art, given the descriptions of data fields herein.

According to different embodiments, the Database 110 includes a user profile database (also referred to herein as "user profile"), which includes information regarding users and Devices 125. The user profile database for a particular user may include user preferences regarding mapping options, marketing and advertising filters, shopping and general user interests, monitoring and tracking preferences, and keyword specifications. The user profile database may also contain a number of "logical location" mappings to locations in the electronic map database, wherein different locations are associated with businesses and points of interest (i.e. home, residences of friends and family, regular travel routes, etc.) situated in those locations. These "logical location" mappings may be user specific, applicable to more than one user, or applicable to public locations (retail, parks, etc.). A user profile database may be maintained in one or any number of tables, and the user profile tables may be in any number of geographic locations.

According to different embodiments, one or more user interfaces may be provided to allow a user to modify various aspects of their profile from the Mobile Communications Device 125, from a desktop computer connected to the Internet, or from a variety of other devices communicatively coupled to or otherwise in communication with the Internet or the Server Computer System 105. Privileges related to accessing and modifying user profile and preference information may be modified by a user, or may be specifically mandated by an application. The user profile and preferences enable the customized presentation and content of information on a personalized basis. The design and organization of the aforementioned tables is discretionary and within the skill of those of ordinary skill in the art, given the descriptions of data fields herein.

Therefore, according to a number of embodiments, the Mobile Communications Device 125 may be configured to transmit additional data destined for the Server Computer System 105, which modifies the user profile from the Device 125. The user may thus change preferences from the Device 125, without logging on from a personal computer. Alternatively, the user profile may be modified from a personal computer or other Device 125 connected to the Internet, as described above.

According to some embodiments, the Database 110 includes an authentication database, which may include user id and password information. Other types of authentication information can be stored in the Database 110 as well, examples of which are apparent to those skilled in the art in light of this disclosure. Various authentication schemes known in the art may be used in accordance with embodiments of the invention, as discussed below.

As noted above, the Server Computer System 105 may include application software that enables the Server Computer System 105 to perform one or more functions according to the present invention. According to different embodiments of the invention, one application of the Server Computer System 105 is an Authentication Application. Users of a Mobile Communications Device 125, and other users wishing to access information within the System 105, may be required to provide some manner of authentication. According to some embodiments, the Authentication Application may be as simple as inputting a user id and password into the Mobile Communications Device 125. Credentials may be stored in a Mobile Communications Device 125 or other device in the form of cookies, certificates, or device identifiers (e.g. SIM chips or IDs). Device 125 specific authentication procedures may be used as well. Those skilled in the art will recognize the variety of different options available.

According to different embodiments of the invention, one application of the Server Computer System 105 is an user interface application. The user interface application serves as the bridge between the user profile database and the user, allowing a privileged user to add, modify, or delete information, or simply providing read only access to information. The user interface may be accessed through the Device 125, or otherwise through a web interface or client device over the Network 115. The user interface application can provide the interface to access the applications and functionality discussed below, or that functionality can be provided outside of the user interface as stand alone applications.

According to different embodiments of the invention, one application of the Server Computer System 105 is a Mapping Application. According to some embodiments, the Mapping Application integrates the electronic map data with location information from the Mobile Communications Device 125 and produces a map image that is directed to the Mobile Communications Device 125 or class of devices.

According to different embodiments of the invention, there are other applications of the Server Computer System 105, which are discussed in greater detail below. The applications are run on the Server Computer System 105. The output of the applications may be directed to the Mobile Communications Device 125, may be stored, or may otherwise be transmitted over the Network 115.

As is evident from the above description, a number of different configurations of the Server Computer System 105 are possible. According to different embodiments, the Server Computer System 105 comprises a web server in communication with a database server. The Authentication and User Interface applications run on the web server. According to these embodiments, the remaining applications run on the database server. The database server enables access to the database, enables access and modification of content, processes the data according to the applicable application, and transmits customized responses.

The Server Computer System 105 communicates with the Mobile Communications Base Station 120 via the Network 115. The Mobile Communications Base Station 120 comprises a facility which sends and receives radio signals to and from the Mobile Communications Device 125, as known in the art. The signals may be for purposes of cellular telephone communications. As used herein, "cellular" should be interpreted in a broad sense to include any of the variety of known modes of wireless or mobile voice communications. Exemplary cellular systems include, but are not limited to, time division multiple access ("TDMA") systems, code division multiple access ("CDMA") systems, and Global System for Mobile communications ("GSM") systems. Other exemplary cellular systems include systems known in the art as "3G" systems, Enhanced Data Rates for GSM Evolution ("EDGE") systems.

In some embodiments, the Mobile Communications Base Station 120 may be communicatively coupled or otherwise in communication with standard cellular network components known in the art. The Mobile Communications Base Station 120 may be in communication with a mobile switching center("MSC"). To provide connectivity between cellular subscribers, the MSC may also be in communication with a telephone network such as the public switched telephone network ("PSTN"), and may query or otherwise utilize a Signal Control Point, additional components that are well known to those skilled in the art.

The Mobile Communications Base Station 120 may also be comprised of a wireless access point which sends and receives radio signals to and from the Mobile Communications Device 125. Such a wireless access point includes any device that provides a wireless interface and provides connectivity to the Server Computer System 105. By way of example, such access points may be "WiFi" hot spots that comply with the wireless standards developed in association with IEEE 802.11, including, but not limited to IEEE 802.11(a), IEEE 802.11(b), IEEE 802.11(g), and IEEE 802.11(n), which is currently under development. Those skilled in the art will recognize the myriad of potential configurations surrounding the Mobile Communications Base Station 120. Under these embodiments, the Server Computer System 105 communicates with the Mobile Communications Base Station 120 over the Network 115.

According to different embodiments of the present invention, a Mobile Communications Device 125 can be a cellular telephone, a personal digital assistant, a pager, a text messaging device, a laptop, a portable music player, a two way radio, or any mobile device that communicates voice or data. The Mobile Communications Device 125 and the Mobile Communication Base Station 120 communicate via a communications link, at least a portion of which is wireless.

The Mobile Communications Device 125 may preferably be comprised of hardware elements that are electrically coupled via bus, including a microprocessor, a wireless receiver component, a wireless transmitter component, a computer-readable storage media reader, and a memory. Additionally, the storage media reader is further connected to a storage medium. There may also additional components communicatively coupled to the device, including an output component, such as a screen, display, or speaker, and an input component such as a keyboard, touchscreen, or microphone. Those skilled in the art will recognize that this is but one of a number of possible configurations for the Mobile Communications Device 125.

The Mobile Communications Device 125 is also coupled to a receiver component which enables the reception of location based information, also referred to herein as "data which identifies the location of the device," "location data," "location based data" or "location information." The receiver may be coupled to the Mobile Communications Device 125 in any suitable manner known in the art. By way of example, it may be an integrated component or may be a stand alone receiver otherwise communicating with the Mobile Communications Device 125.

The location based information may be in the form of Satellite 130 location information, cellular location information, network analysis of location information, location information specific to a building, or other means for location determination. The location based information may be based on triangulation using cellular towers or access points. GPS related location information is discussed in greater detail below. Alternatively, cellular carriers may employ other means of locating cellular telephones and other mobile computing devices using cellular towers. By way of example, the time difference of arrival, angle of arrival, and location pattern matching methods are well known in the art as alternative means of obtaining location information.

According to some embodiments, the location based information may be in the form of a Global Positioning System ("GPS") coordinates. To illustrate how the Mobile Communications Device 125 receives and transmits location information, GPS will be used. However, one skilled in the art will recognize that similar principles could be applied with other location based information. GPS is navigation system wherein location information is ascertained from a constellation of deployed satellites 130. GPS provides continuous positioning and timing information anywhere in the world, utilizing very accurate atomic clocks. GPS is a one way system, wherein users only receive information.

The design of the GPS system attempts to ensure that four (4) or more satellites 130 will always be visible. With the timing and position information received from the satellites, the Mobile Communication Device 125 or Server Computer System 105 "triangulates" the position of the Mobile Communications Device 125. GPS systems can also measure altitude, speed, and direction of travel. Those skilled in the art will recognize that as technology evolves and new generations of satellites are launched with the GPS system, some of the characteristics of the system may change.

Each GPS satellite continuously transmits a microwave signal comprised of two carrier frequencies, modulated by two digital codes and a navigation message. The two GPS carrier frequencies are generated at 1,572.42 MHz (LI carrier) and 1,227.60 MHz (L2 carrier). The two GPS modulation codes are called coarse acquisition ("C/A Code") and precision ("P Code"). Each code is comprised of a stream of binary digits, and is considered a pseudo random noise ("PRN") code. However, the codes are generated using a complex mathematical algorithm. The precise code modulation for each satellite differs. The C/A code is modulated onto the Li carrier only, whereas the P Code is modulated onto both the L1 and L2 carriers. The navigation message is added to both carriers as binary biphase modulation.

According to various embodiments, the Mobile Communications Device 125 receives a GPS signal and retransmits the signal directly to a Server Computer System 105 via a Mobile Communication Base Station 120. Signal processing, wherein 1) the distances to the GPS Satellites are computed through the digital codes (pseudoranges), and 2) the satellite coordinates are computed through the navigation message, may be undertaken by the Server Computer System 105. Alternatively, the Mobile Communications Device 125 may process the GPS signal itself. According to other embodiments, the Mobile Communications Device 125 partially processes the signal with built in software. According to still other embodiments, the Mobile Communications Device 125 processes the signal, and determines the GPS measurements and transmits the GPS measurements in a data format. By way of example, the format may be RINEX, NGS-SP3, RTCM SC-104, or NMEA 0183. Those skilled in the art will recognize that any number of proprietary formats may be used as well. According to different embodiments, a plurality of GPS antennas are used to determine position location with greater accuracy.

The Mobile Communications Device 125 may, in some cases, transmit alternative location information to the Server Computer System 105. According to some embodiments, the signal strength from different cellular towers may be used to determine position. In these cases, the signal processing, wherein the signal strength and cellular tower identification is used to determine position, is undertaken by the Server Computer System 105, not the Mobile Communications Device 125. In some cases, the Device 125 may not provide the information; instead, cellular towers may triangulate the Device 125 and provide such information to the System 105. Those skilled in the art will recognize the different types of location information that may be received and retransmitted by the Mobile Communications Device 125. Therefore, according to the various embodiments that follow, the location based information may comprise GPS coordinate data, GPS codes and a GPS navigation message, or any location based information described in the application.

Figure 2:
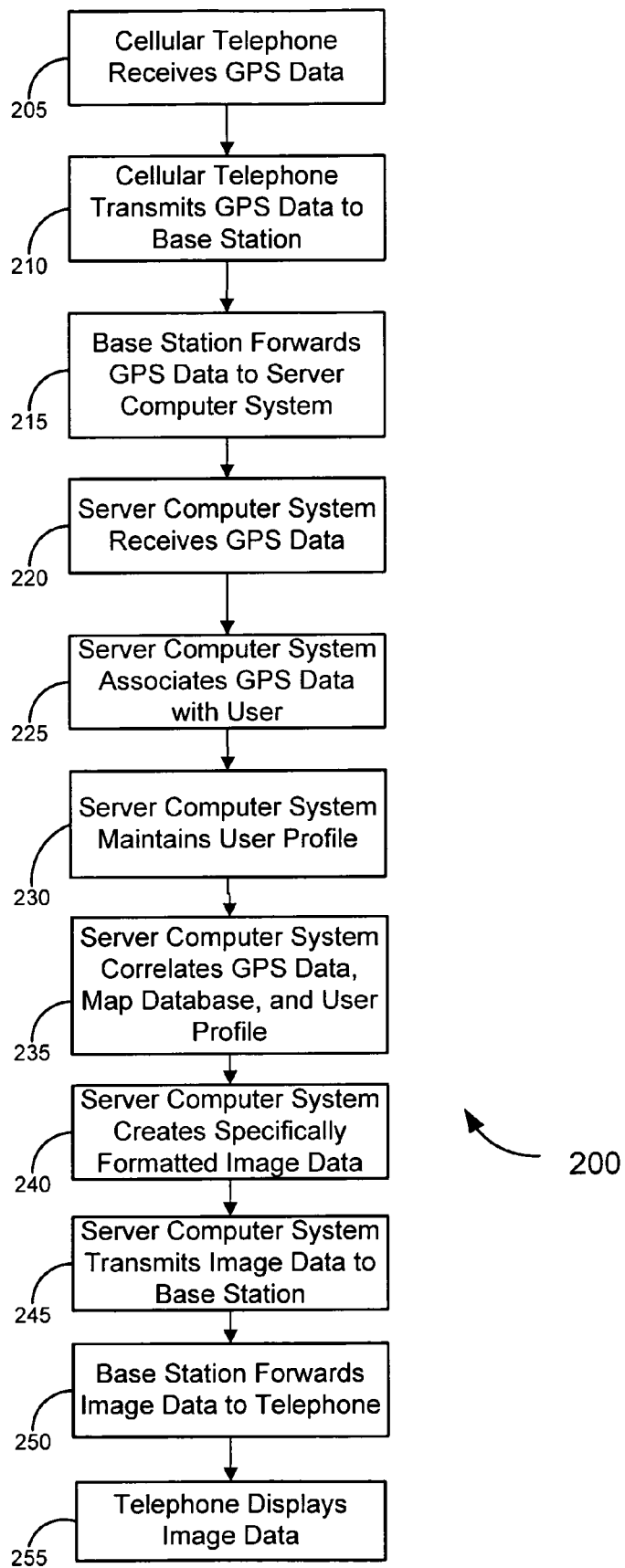
FIG. 2 is flow diagram that illustrates a method of mapping the location of a mobile communications device according to various embodiments of the present invention.

II. Mapping: One set of embodiments of the invention provides systems and methods for mapping the location of a Mobile Communications Device 125. According to these embodiments, the Mapping Application of the Server Computer System 105 creates an image formatted to be received by the Mobile Communications Device 125, or specific class of devices. FIG. 2 illustrates a method 200 of mapping the location of a cellular telephone according to a set of embodiments. The method can be used in a variety of systems, and other methods can be used as well, as is apparent to one skilled in the art in light of this disclosure.

According to some embodiments, the Mobile Communications Device 125 is a cellular telephone configured to receive GPS coordinate data comprised of GPS codes and a GPS navigation message. However, other types of location based data and Devices 125 may be used. The method is initiated when the cellular telephone receives 205 the GPS coordinate data. The cellular telephone transmits 210 the GPS coordinate data to the Mobile Communications Base Station 120, which forwards 215 the data to the Server Computer System 105. Other data may be included in the transmission of GPS coordinate data, such as time, telephone, and user information. The Server Computer System 105 receives 220 the GPS coordinate data, and associates 225 that location information with a particular user. The Server Computer System 105 maintains 230 a user profile which includes information about the user and the Device 125 as discussed above. The user profile may include information about the cellular telephone necessary to identify the user, or a user may be identified or otherwise authenticated in any other fashion known in the art.

The Server Computer System 105 correlates 235 the location data, information in the user profile relating to the user and the telephone, and mapping and location information in the electronic map database. The user profile may include information about the preferences of the user regarding the display of information. The Server Computer System 105 creates 240 image data illustrating a map, and the location of the Device 125. The image data is specifically formatted for display on the Device 125 or class of devices, and is based on the information about the device in the user profile. The Server Computer System 105 transmits 245 the image data to the Base Station 120, which then forwards 250 the image data to the Device 125. The image data may be transmitted in an email, instant message, or other format. The Device 125 receives the image data, and displays 255 the image data on a screen coupled to the Device 125. The above exemplary embodiment merely represents an example of different embodiments of the invention.

According to different embodiments, the Mobile Communications Device 125 is further configured to transmit additional data destined for the Server Computer System 105 which modifies the user profile from the Device 125. The user may thus changes preferences regarding the content of the image data from the Device 125, without logging on from a personal computer. Alternatively, the user profile may be modified from a personal computer or other device connected to the Internet (e.g. via a web interface, dedicated client, etc.).

The Server Computer System 105 may also be configured to store location information received from a Mobile Communications Device 125 on a storage medium, and include a graphical representation of the historical locations of the Device 125 within a time period. One skilled in the art will recognize how historic location data can be correlated with information in the user profile and mapping and location information in the electronic map database.

The user profile may also include preferences of the user identifying the circumstances in which the locations of a variety of businesses and other points of interest will be included in the image data. The preferences may include filters enabling different preferences according to times of day, geographic location, or other user input. The image data may then include a variety of graphical identifiers relating to the businesses and other points of interest, such as colors, dots, text, or icons. The identifiers may also comprise hyperlinks to additional information about the businesses or points of interest.

According to some embodiments, the Mobile Communications Device 125 may transmit the GPS coordinate data or other location information according to a variety of algorithms, one of which 400b is discussed in detail below. According to other embodiments, the Server Computer System 105 receives additional location data which identifies locations of other Devices 125, such as the those of friends or family. Alternatively, the Server Computer System 105 may receive additional data identifying a second location or locations, such as a destination or a possible vacation spot. The user profile may be configured to include preferences of the user specifying the circumstances in which the different users and locations will be displayed. The preferences may include filters enabling different preferences according to times of day, geographic location, or other user input. The image data may then include a variety of graphical identifiers relating to the users or locations, such as colors, dots, text, or icons. The image data may also include a suggested route through a selection of the users or locations.

Figure 3:
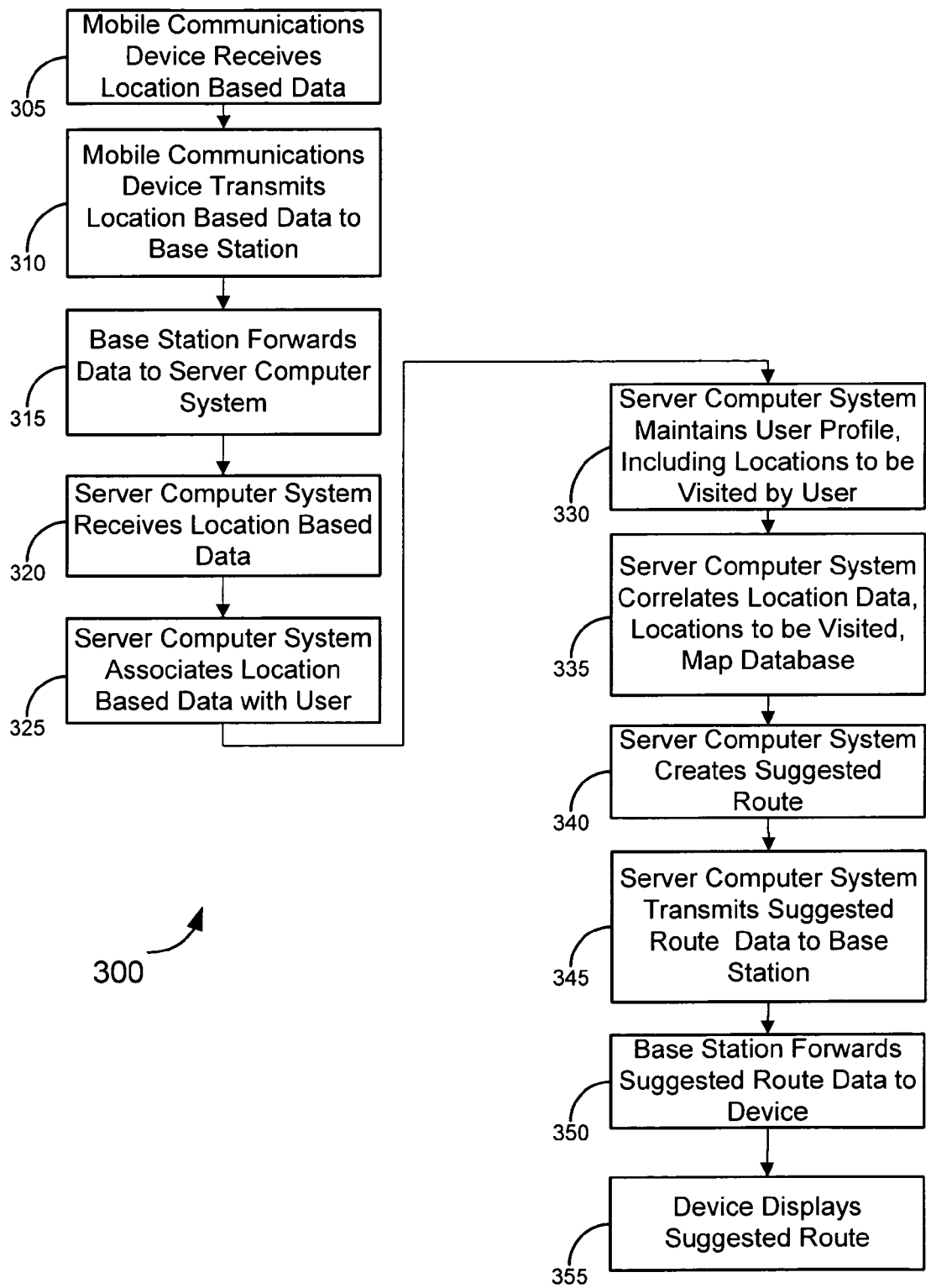
FIG. 3 is flow diagram that illustrates a method for correlating activities with the location of a mobile communications device according to various embodiments of the present invention.

III. Correlating Activities: Another set of embodiments provides systems and methods for correlating activities with the location of a Mobile Communications Device 125. According to these embodiments, the Server Computer System 105 creates a suggested route or otherwise illustrates locations to be visited by a user of a Mobile Communications Device 125. FIG. 3 illustrates a method 300 of correlating activities with the location of a cellular telephone according to a set of embodiments. The method can be used in a variety of systems, and other methods can be used as well, as is apparent to one skilled in the art in light of this disclosure.

According to some embodiments, the Mobile Communications Device 125 is again configured to receive location based information. According to some embodiments, the location based information is obtained through communication with cellular telephone towers (although alternative embodiments may use a variety of techniques to receive location based information, as described above). The method is initiated when the Device 125 receives 305 location based information. The Device 125 transmits 310 the location data to the Mobile Communications Base Station 120, which forwards 315 the data to the Server Computer System 105. Other data may be included in the transmission of location data, such as time, Device 125, and user information. The Server Computer System 105 receives 320 the location based data, and associates 325 that location data with a particular user. As noted above, the Server Computer System 105 may be fully located within a single facility or distributed geographically, in which case a Network 115 may be used to provide communication between or otherwise integrate different components of the Server Computer System 105. As described above, the Server Computer System 105 maintains 330 a user profile database, which includes information about the user and the Device 125. According to these embodiments, the profile includes a listing of a plurality of other locations to be visited by the user of the Device 125. The user profile may include information about the cellular telephone necessary to ascertain the user, or a user may be ascertained or otherwise authenticated in any other fashion known in the art.

The Server Computer System 105 correlates 335 the location data, the information in the user profile listing the plurality of locations to be visited by the user, and mapping and location information in the electronic map database. The user profile may also include information about the preferences of the user regarding the display of information. The Server Computer System 105 creates 340 data that describes a suggested route through the locations to be visited. The data may be in a variety of forms, including text, map images, dynamic direction arrows, or combinations thereof. The Server Computer System 105 transmits 345 the suggested route data to the Base Station 120, which then forwards 350 the suggested route data to the Device 125. The data may be transmitted in an email, SMS message, instant message, or other format. The Device 125 receives and displays 355 the suggested route data on a screen coupled to the Device 125.

According to various embodiments, the user profile database also includes a listing of a number of tasks to be performed by the user of the Device 125. The listing of tasks may include such things as "groceries," "gas," "cleaners," "pick up kids at school," "go to park" and so on. The user profile may also include a listing of a variety of businesses and other points of interest and their associated locations. The user profile may further include a correlation between the locations and tasks identified by the user. An application of the Server Computer System 105 matches the tasks and the locations of businesses and other points of interest in light of the location based information, to identify locations to be visited by the user in order to accomplish the tasks.

By way of example, if "gas" and "groceries" are on the listing of tasks, the application would match a gas station and grocery store identified in the listing of businesses and other points of interest that are also in the vicinity of the Device 125. The design of such databases and matching algorithms are well known by those skilled in the art in the design of relational database systems. According to certain embodiments, the listing of tasks is populated by data from a electronic personal calendar embodied on a computer readable medium.

According to other embodiments, the user profile further includes a number of preference levels corresponding to businesses and other points of interest. These preference levels may signify different ranges of preference or likeability that a user associates with a specific business or point of interest. By way of example, at the user interface, the levels may be numbers, letters, colors, logos, icons or any other feature.

According to some embodiments, a destination or other location is received, and the data created by the Server Computer System 105 includes the destination or other location. According to other embodiments, the data created is image data which is comprised of a map illustrating the location of the Device 125, other locations to be visited by the user, and a suggested route. The suggested route may be determined using shortest path algorithms known in the art, by order of priority of the task, combinations thereof, or any other criteria. The locations to be visited by the user may be comprised of icons which may be hyperlinks to further information. According to different embodiments, the locations to be visited by the user are illustrated without any suggested route.

Figure 4A:
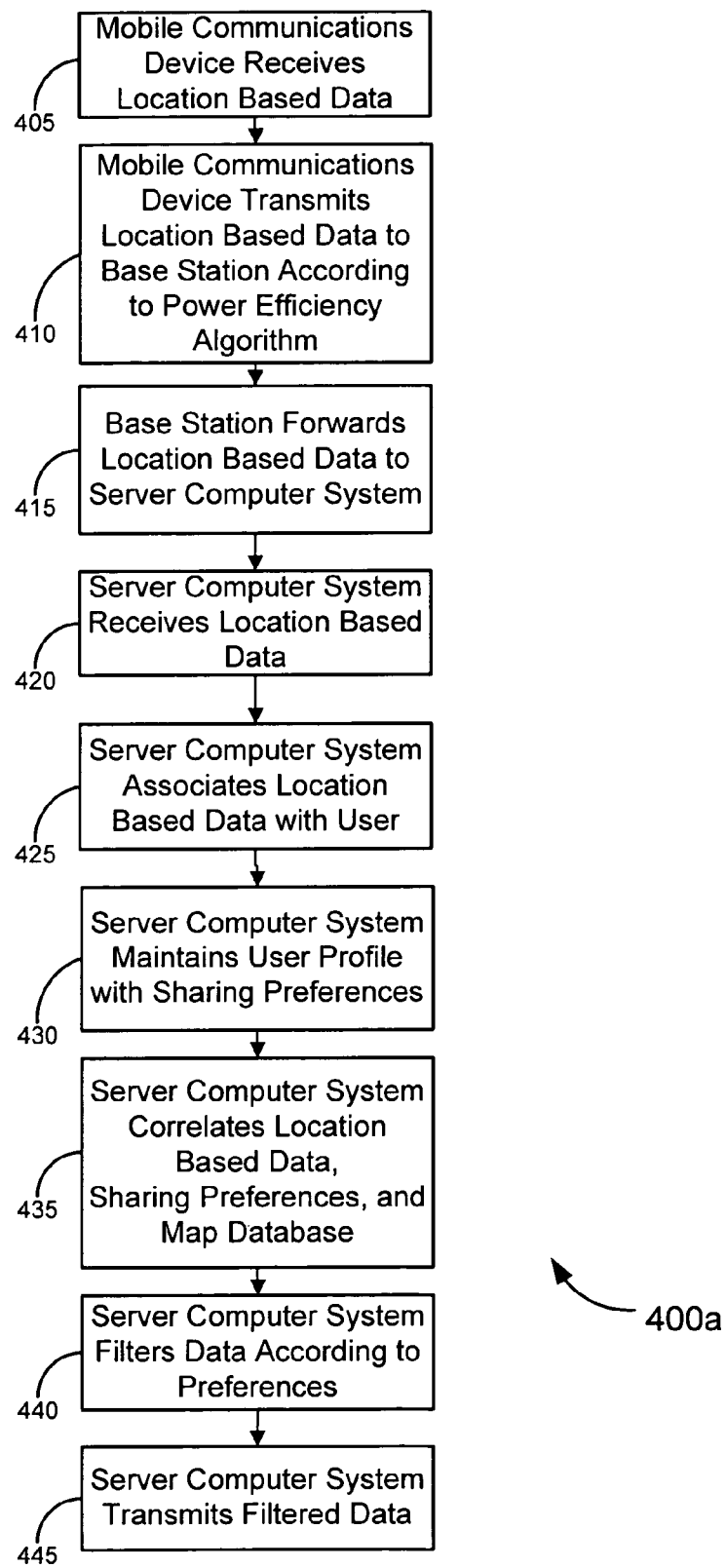
FIG. 4A is a flow diagram that illustrates a method of efficiently determining the location of a mobile communications device according various embodiments of the present invention.

IV. Efficiently Determining Location: Another set of embodiments of the invention provides systems and methods for efficiently determining the location of a Mobile Communications Device 125. According to these embodiments, the Server Computer System 105 receives location based information transmitted according to a power efficiency algorithm 400b, and filters and transmits location data according to the preferences of the user. FIG. 4A illustrates a method 400a of efficiently determining the location of a Device according to a set of embodiments. The method can be used in a variety of systems, and other methods can be used as well, as is apparent to one skilled in the art in light of this disclosure.

Figure 4B:
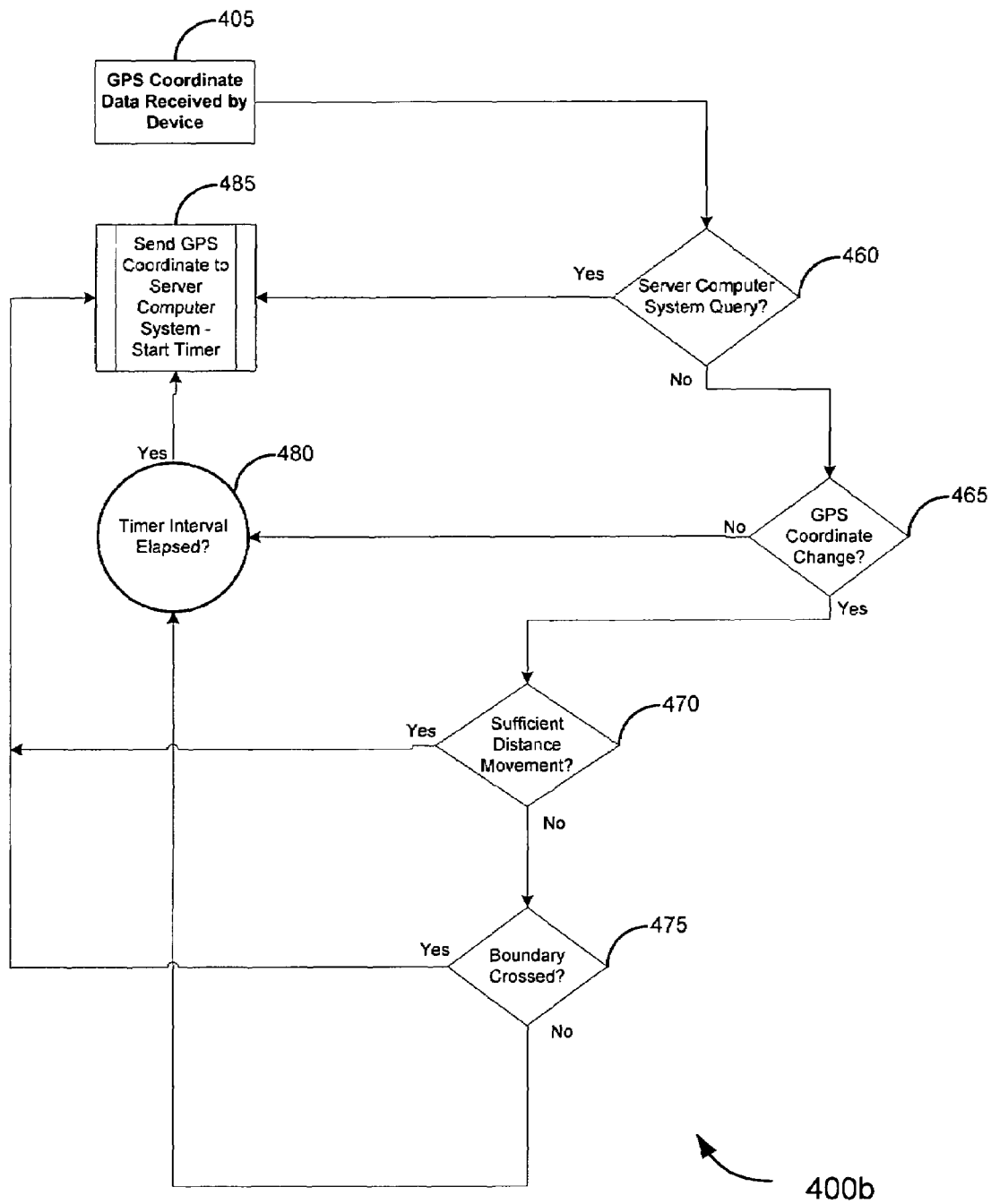
FIG. 4B is a flow diagram that illustrates a method of communicating location information from mobile communications device according to various embodiments of the present invention.

The method is initiated when the Mobile Communications Device 125 obtains 405 location based information (e.g. receiving it from a Satellite 130). The Device 125 transmits 410 the location data to the Mobile Communications Base Station 120, which forwards 415 the data to the Server Computer System 105. Other data may be included in the transmission of location data, such as time, Device 125, and user information. The transmission from the Device 125 may occur on intervals based on the algorithm 400b described below, and illustrated in FIG. 4B. According to different embodiments, the algorithm 400b may be modified by the user directly on the device, or by modifying the user profile from the device or via a web interface. Alternatively, the Server Computer System 105 may otherwise transmit data which modifies the algorithm 400b.

According to certain embodiments, the Device transmits the location based information on the earliest of the four following intervals:

1. Query from the Server Computer System 105: The first transmission initiation factor 460 is a message received by the Device 125 from the Server Computer System 105 requesting transmission 485 of location based information. For example, if a second user queried the Server Computer System 105 regarding location based information about the user of the Device 125, the Server Computer System 105 may be programmed to immediately query the Device for location based information. The second user may want the information for tracking or monitoring purposes.

2. Distance Movement Metric: The second transmission initiation factor 470 is a Distance Movement interval, wherein the Device 125 may be programmed to transmit 485 location based information according to changes 465 in the location based information received by the device. Merely by way of example, the Device 125 may be programmed to transmit the location based information if the information indicates a 500 meter change in location from previous location based information transmission. Distance movement transmission preferences may be longer or shorter, but shorter distances may cause increased numbers of transmissions and drain power. According to different embodiments, different distances can be specified for each user or Device 125 during different times of the day, different days, different locations, and so on. The distance preferences for an individual user may be stored or modified in the user profile database, and transmitted to the Device 125. Alternatively, a service provider could program the Device 125 for different distances. One skilled in the art will recognize the variety of different programming options.

3. Geographic Boundary Metric: The third transmission initiation factor 475 is a Geographic Boundary metric, wherein the Device 125 may be programmed to transmit 485 location based information according to movement 465 of the device across certain geographic boundaries. The boundaries may correspond, for example, to certain GPS coordinates. By way of example, the Device 125 may be programmed to create a boundary around the grounds of a school, or the buildings or classrooms within the school. The Device 125 transmits the location based information if GPS coordinates indicate that the geographic boundaries have been crossed. There may be any number of geographic boundaries of varying sizes, but more boundaries and smaller sizes may cause increased numbers of transmissions and drain power. According to different embodiments, different boundaries may be specified for each user or Device 125 during different times of the day, different days, different locations, and so on. The boundary preferences for an individual user may be stored or modified in the user profile database, and transmitted to the Device 125. Alternatively, a service provider could program the Device 125 for different boundaries. One skilled in the art will recognize the variety of different programming options.

4. Time Interval Metric: The fourth transmission initiation factor 480 is a time interval, wherein the Device 125 may be programmed to transmit 485 location based information within a specified time period after each transmission. For example, the Device 125 may be programmed to transmit the location based information every 30 minutes after a transmission of location based information, unless location based information was transmitted from the Device during the interim period according to one of the other 3 factors. According to different embodiments, different time intervals can be specified for each user or Device 125 for different times of the day, different days, different locations, and so on. The time preferences for an individual user may be stored or modified in the user profile database, and transmitted to the Device 125. Alternatively, a service provider could program the Device 125 for different time intervals. One skilled in the art will recognize the variety of different programming options.

According to other embodiments, two or three of the following four (4) metrics described above may be used: 1) Query from the Server Computer System 460, 2) Distance Movement Metric 470, 3) Geographic Boundary Metric 475, 4) Time Interval Metric 485. According to some embodiments, the Device 425 transmits the location based information on the earliest of the two or three selected intervals. According to other embodiments, the Device 425 transmits the location based information based on alternative factors related to the four (4) metrics.

Returning to FIG. 4A, the Server Computer System 105 receives 420 the location based information, and associates 425 that location information with a particular user. As noted above, the Server Computer System 105 may comprise any number of computing devices 105a, such as server computers, personal computers, workstations, or web servers. The Server Computer System 105 maintains 430 a user profile which includes information about the user and the Device 125. The user profile may also include information regarding the circumstances in which the location based information should be stored in the Database 110.

According to some embodiments, the user profile includes preferences of the user of the Device 125 regarding the sharing of location based information. The preferences may include information such as: a) which other users or groups of other users may access location based information, b) when each other user or group may access location based information (times of day, days of the week), c) how granular the information requested may be (State, City, Street, etc.), or d) how each other user or group may access location based information (for example, can they monitor or track the device). Additional preferences may include whether an other user or group may access historical location based information, and which historical location based information can be accessed. A user may also grant access rights on a per inquiry basis, such that rights would be required to be given by the user with each inquiry about location based data. According to different embodiments, there are a number of different "access levels," which correlate series of preferences. For example, one access level could be "Universal," granted to a family member to enable access to all of the location data. One skilled in the art will recognize the variety of options available regarding preferences and the user profile.

The Server Computer System 105 correlates 435 the location data, the aforementioned preferences of the user, and mapping and location information in the electronic map database. The Server Computer System 105 filters 440 the location data according to the preferences of the user. The filtered data may be maintained in a variety of formats, including coordinate data, text, map images, or combinations thereof. The Server Computer System 105 transmits 445 the filtered data. The destination of the filtered data may be an other user trying to access the information from a mobile communications device or a personal computer connected to the Internet or Server Computer System 105. The data may be transmitted in an email, instant message, voice message, web page, or any other appropriate format. The above exemplary embodiment merely represents an example of different embodiments of the invention.

According to various embodiments, the Server Computer System 105 may store the location data received according to preferences in the user profile, or other parameters. According to some embodiments, other users may request location based information about the user of the Device 125. The other users may request "real-time" or historic information, or certain subsets of information within these broader categories. The other users may track, monitor, or otherwise receive location based information about the user from a mobile communications device. The other users may make tracking, monitoring, and other such inquiries from these other devices, without logging on from a personal computer. Alternatively, the inquiries may be made and information viewed from a personal computer or other device connected to the Internet. The other users may receive information in a variety of forms, as noted above. According to some embodiments, the other users may indicate their preferences regarding the format of the information. In addition, they may indicate the time period for tracking a user, or request certain periodicity of updates or alerts based on time, movement, or boundary metrics, as described above.

According to different embodiments, the Server Computer System 105 may transmit the monitoring or tracking information (i.e. the filtered data) to the other users at intervals related to time, movement of the device, and crossing of geographic boundaries. These interval metrics 400b are discussed in detail above, and no further specific discussion is necessary. According to these embodiments, the other user inquiring about location information can receive updated (time interval) information and alerts (movement/boundary) about the location of the user.

According to different embodiments of the invention, the user preferences regarding the sharing of location based information may be programmed by a service provider, and administrator, or a user, or may be preprogrammed onto the device. In some embodiments, the user may not change the preferences. Alternatively, someone other than the user may be the only person allowed to change the preferences, or the user may be required to receive authorization before any changes are made.

According to different embodiments, the Server Computer System 105 receives location based data from a number of mobile communications devices. That location based information is then correlated with preferences of the users associated with each device. These embodiments enable the monitoring or tracking of multiple users.

Figure 5A:
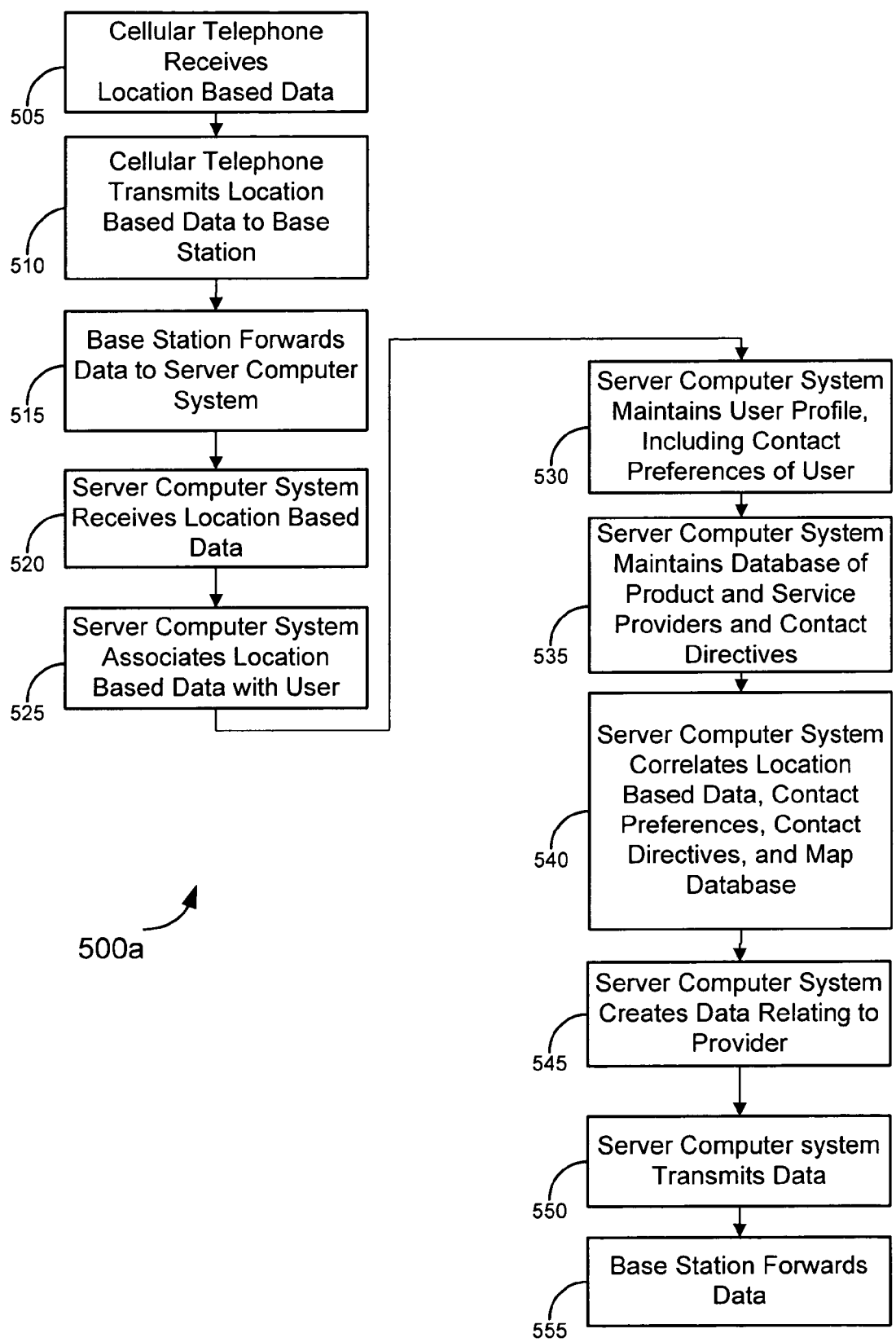
FIG. 5A is a flow diagram that illustrates a method of user defined notification related to a mobile communications device according to various embodiments of the present invention.
Figure 5B:
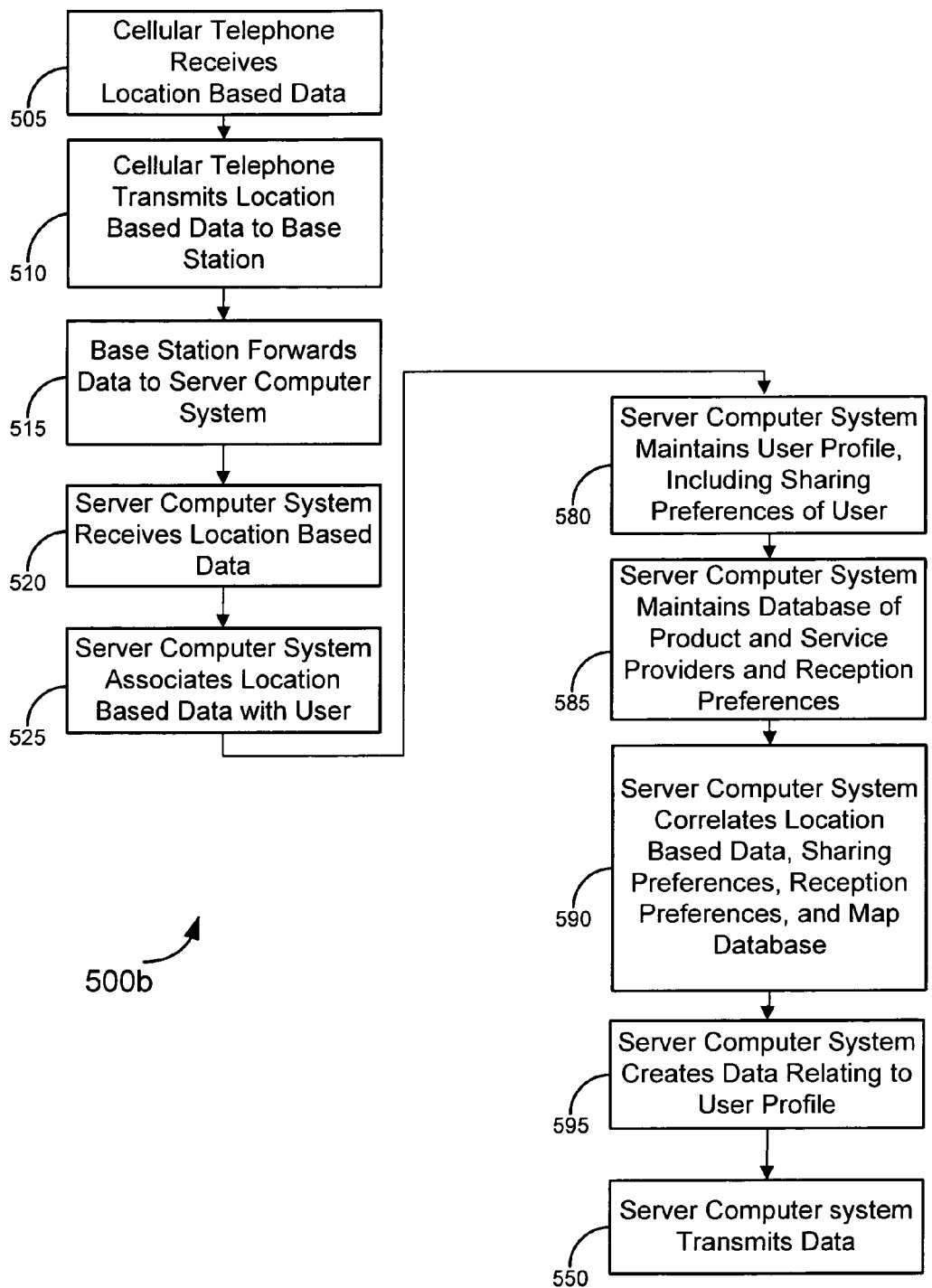
FIG. 5B is a flow diagram that illustrates a method of user defined sharing of information related to a mobile communications device according to various embodiments of the present invention.

V. User Defined Notification: Another set of embodiments of the invention provides systems and methods allowing for user defined notification related to the location of a Mobile Communications Device 125. According to some embodiments, illustrated in FIG. 5A, the Server Computer System 105 creates 500a information related to providers of products and services for transmission under defined circumstances to a Mobile Communications Device 125. According to other embodiments, illustrated in FIG. 5B, the Server Computer System 105 creates 500b information related to a user of a Device 125 for transmission under defined circumstances to product and service providers. The methods can be used in a variety of systems, and other methods can be used as well, as is apparent to one skilled in the art in light of this disclosure.

According to some embodiments, the Mobile Communications Device 125 is a cellular telephone configured to receive location based information. However, the methods could be used with any other appropriate Mobile Communications Device 125. The method is initiated when the cellular telephone receives 505 location based information. The cellular telephone transmits 510 the location data to the Mobile Communications Base Station 120, which forwards 515 the data to the Server Computer System 105. Other data may be included in the transmission of location data, such as information related to time, telephone, and user. The Server Computer System 105 receives 520 the location data, and associates 525 that location information with a particular user. As noted above, the Server Computer System 105 may be fully located within a single facility or distributed geographically, in which case a Network 115 may be used to integrate different components 105a of the Server Computer System 105.

The Server Computer System 105 maintains 530 the user profile. According to these embodiments, the user profile includes a listing of the contact preferences of the user of the Device 125. The contact preferences may include information about the times, locations, types of product and service providers of interest (specific providers or general preferences), format of contact, and other circumstances in which the user prefers to be contacted. The user profile may include information about the preferences of the user regarding the preferred format and the display of information. For example, a user may specify that between 4:00 and 6:00 p.m., on certain roads, he or she would like to receive an email with a map alerting him or her to certain types of restaurants. Product and service providers may include, without limitation, grocery stores, gas stations, health clubs, video stores, medical offices, museums, national parks, amusement parks, and any other retail or service establishments. According to some embodiments, the user profile contains preferences of the user regarding the sharing with such providers of location based information and other information in the user profile.

The Server Computer System 105 also maintains 535 a database of product and service providers ("provider database"), contained in the Database 110. The provider database includes information about certain product and service providers, and the information may include location, products or services offered, hours, special offers or coupons, reviews, and so on. Locations of the product and service providers are "logically mapped" to the electronic map database, as described above. The provider database also includes specific directives from each product and service provider regarding the circumstances in which the Server Computer System 105 should contact a user of a Device 125, along with direction regarding the information that should be included in the contact. According to different embodiments, the provider database also includes information about the circumstances in which the provider would like to receive information about a user of a Device 125 in light of location based data and available information contained in the user profile.

The Server Computer System 105 correlates 540 the location based information, the contact preferences of the user, the specific contact directives of the product and service providers, and mapping and location information in the electronic map database. The Server Computer System 105 creates 545 data which includes information related to at least one of the product and service providers. The data may be in a variety of forms, including text, audio messages, map images, dynamic direction arrows, or combinations thereof. The Server Computer System 105 transmits 550 the data to the Base Station 120, which then forwards 555 the data to the user of the Device 125. The data may be transmitted as an email, a cellular telephone message, an instant message, or in any other format. The above exemplary embodiment merely represents an example of different embodiments of the invention.

According to different embodiments, the user profile further includes a number of preference levels corresponding to business and service providers. These preference levels may signify different ranges of preference or likeability that a user associates with a specific business or service provider, or may correspond to classes of product and service providers. By way of example, a user may express high preference for health food stores, and a low preference for fast food restaurants.

The Server Computer System 105 may store location based data, communication, responses, and other input from the user. According to different embodiments, the preferences levels are assigned based on inferences from the Server Computer System 105 from the collection and analysis of data related to this stored information from the user.

According to some embodiments, the user may receive contact or alerts based solely on changes in the location based data. For example, users and product and service providers may have specific preferences for the transmission or receipt of information based on vicinity parameters. According to different embodiments, a user may input information about an other location, such as a location that they will be visiting soon or are otherwise interested in. In so doing, the user (through their user profile preferences) would be enabled to receive information or offers from product or service providers at that second location, or may share information with product and service providers at that second location.

According to other embodiments, the data to be transmitted to the user is image data which may comprise a map illustrating the current or other location of the user, and a representation of at least one of the product or service providers. The product and service providers may be shown as icons, which may also represent hyperlinks to further information about the provider. According to other embodiments, the data to be transmitted to the user is a suggested route to or through the product and service providers.

According to different embodiments, certain data contained in the user profile is transmitted to a product or service provider. According to some of these embodiments, many of the steps are similar (505-525, 555), but there may be a number of variances depending on the particular embodiment. According to the method 500*b* illustrated in FIG. 5B, the user profile 580 contains preferences of the user regarding the sharing of location based information and other information in the user profile ("sharing preferences"). Such sharing preferences may be very similar to contact preferences, except that they relate to user profile information to be shared, instead of preferences regarding contacts. Sharing preferences may include information about the times, locations, types of product and service providers of interest (specific providers or general categories of providers), amount of information to be shared, and other circumstances in which the user prefers to share information. For instance, a user may specify that between 7:00 am and 8:00 am, near work, they would like to share information with specified coffee shops.

According to these embodiments, the Server Computer System 105 also maintains 585 a database of product and service providers, which may be contained in the Database 110. The provider database for these embodiments is similar to the provider database 535 described above. This provider database 585 includes information about certain product and service providers, and the information may include location, hours, products and services offered, types of user profile information requested, times user information requested, and so on. Locations of the product and service providers may be "logically mapped" to the electronic map database, as described above. The provider database includes specific directives from each product and service provider regarding the circumstances in which the provider would like to receive user profile information from the Server Computer System 105, along with direction regarding the information that should be included (i.e. "Reception Preferences"). Such information may include times of day, geographic location of user, user characteristics (income, age, gender, etc.).

The Server Computer System 105 correlates 590 the location based information, the sharing preferences of the user, the reception preferences of the product and service providers, and mapping and location information in the electronic map database. The Server Computer System 105 creates 595 data which includes information related to a subset of a user profile. The Server Computer System 105 may transmit 550 the data, this time to a provider.

According to different embodiments, the user profile further includes a number of access levels granting different "sets" of access rights to business and service providers, or classes of business and service providers. These access levels grant different depths of access to user profile information. Access levels may reduce complexity and improve usability. Access levels may correspond to preferences of the user regarding the sharing of location based information and other information in the user profile. Alternatively, users may grants specific access levels to specific product and service providers. For instance, a user may grant "minimum" access to location based data to all gas stations, while providing "moderate" access to a favorite chain of grocery stores.

Figure 6:
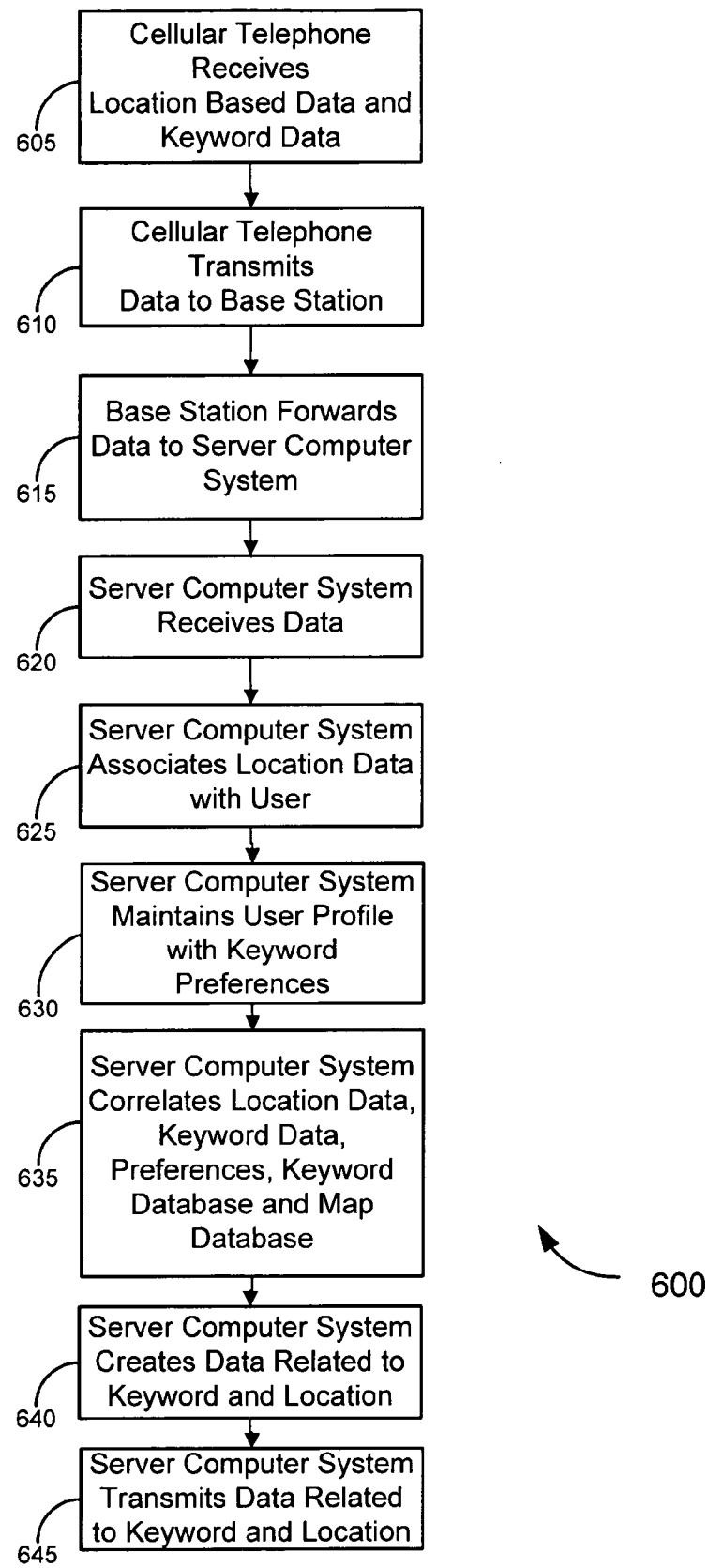
FIG. 6 is a flow diagram that illustrates a method of correlating keyword and location information according to various embodiments of the present invention.

VI. Keywords: A further set of embodiments provides systems and methods for providing information based on keywords, and location based data from a Mobile Communications Device 125. According to these embodiments, the Server Computer System 105 creates and transmits information related to keywords and the location of a Device 125 under defined circumstances. FIG. 6 illustrates a method 600 of providing information related to a keyword and the location of a cellular telephone according to a set of embodiments. The method can be used in a variety of systems, and other methods can be used as well, as is apparent to one skilled in the art in light of this disclosure.

According to some embodiments, the Mobile Communications Device 125 is a cellular telephone configured to receive GPS coordinates, although any Device 125 and any form of location based data could be used. The method is initiated when the cellular telephone receives 605 location based information, and data that contains a keyword. The receipt of this keyword data can be in a variety of forms. The keyword can be input as text through a keypad, touchpad, or other manual input device. Alternatively, an email, instant message, text message, web page, or other viewed or sent electronic text may be monitored or otherwise scanned for the existence of keywords. According to different embodiments, audio input into a microphone can be interpreted to text with speech recognition software. Such audio input may include words spoken by a user into the Device 125, received by the Device 125 from a call participant, or otherwise reproduced by a speaker coupled to the device, A variety of speech recognition software is commercially available, and well known in the art. The software may be stored in the storage media or memory of the Device 125, or may be stored in the Server Computer System 105. The speech recognition software may thus interpret the audio (or analog or digital recording of the audio) on the Device 125 or at the Server Computer System 105.

Software related to the keyword filter may be stored in the storage media or memory of the Device 125, or may be stored in the Server Computer System 105. Software with text filter functionality is well known in the art. A specialized microprocessor (such as a DSP chip) coupled to the Device 125 may be specifically configured to monitor for the keywords, or the general microprocessor can provide that functionality. The filter process can take place on the Server Computer System as well, using suitable hardware.

The cellular telephone transmits 610 the location based data and keyword data to the Mobile Communications Base Station 120, which forwards 615 the data to the Server Computer System 105. Other data may be included in the transmission as a part of the location and keyword data, such as time, telephone, and user information. The Server Computer System 105 receives 620 the location based data and keyword data, and associates 625 the location information with a particular user.

The Server Computer System 105 maintains 630 the user profile. The user profile includes "keyword preferences" regarding the manner in which keyword information should be processed, if at all. According to some embodiments, the user may input specific keywords, and associate various actions to be undertaken by the Server Computer System 105 if the keywords are received (e.g. If "Hiking," search for nearest hiking trails that allow dogs). Alternatively, the user may input specific action to be undertaken from keywords already listed in the user profile by the Server Computer System 105 (e.g. If "Coffee," then search for independent coffee shops). In other embodiments, the user profile contains preprogrammed actions to be undertaken when keywords are received by the System 105 (If "Hungry," search for local restaurants). Thus, according to different embodiments, both a) the keywords and b) the actions to be undertaken can be preprogrammed, modified, added, or deleted.

A keyword database is maintained in the Database 110 by the Server Computer System 105, wherein both the standard keywords and the associated standard actions to be undertaken are stored. Standard keywords and actions include those provided by the System 105 to be used by all users. In addition, a listing of business and service providers and points of interest may be maintained, along with information regarding their "logical location" mapping, as described above. Their location, products or services offered, hours, special offers or coupons, reviews, and so on may also be included. Each of the business and service providers and points of interest is associated with at least one keyword.

According to various embodiments, there are a number of further options for the user profile database. The user profile may include keyword preferences of the user regarding variable actions to be undertaken at different times and geographic locations (e.g. If "Dancing," and after 10:00 p.m., search for local Discos). Also included may be preferences related to general and specific interests, including product and service providers of interest (specific providers or general categories of providers), points of interest, display of information, format, amount and nature of contact, and so on. The user profile may include a number of preference levels corresponding to the providers and the points of interest. These preference levels may signify different ranges of preference or likeability that a user associates with a specific business or point of interest. The user profile and keyword preferences enable the customized presentation and content of information on a personalized basis. The preferences can relate to keywords, associated actions, or the listing of business and service providers and points of interest.

The Server Computer System 105 correlates 635 the location data, the keyword, the preferences of the user, the keyword database, and mapping and location information in the electronic map database. The design of such databases and matching algorithms are well known by those skilled in the art in the design of relational databases. The Server Computer System 105 creates 640 information related both to the location of the user and the keywords received, filtered by the keyword preferences of the user. The created data may be contained in a variety of formats, including text, images, map images, or combinations thereof. Image data may include a variety of graphical identifiers relating to the points of interest and product and service providers, such as colors, dots, text, or icons. The identifiers may also comprise hyperlinks to additional information. Image data may also be formatted to include a suggested route. According to different embodiments, the created data is transmitted 645 to the device.

According to different embodiments, the user may associate keywords with other users, thereby receiving location based information from other users. In other embodiments, keywords may be used in combination to formulate suggested meeting locations (i.e. "Brian"+"Hungry"=suggest meeting at nearest Chinese restaurant). According to other embodiments, a user may input information about an other location, such as a location that the user will be visiting soon or are otherwise interested in. In so doing, the user (through their user profile preferences) would be enabled to receive keyword related information from, for example, product or service providers at that second location.

It should be noted that the methods, systems and devices discussed above are intended merely to be exemplary in nature. Consequently, various embodiments may omit, substitute, or add various procedures or components as appropriate. For instance, it should be appreciated that in alternative embodiments, the methods may be performed in an order different than that described, and that various steps may be added, omitted or combined. Also, features described with respect to certain embodiments may be combined in various other embodiments. For example, the transmission algorithm 400b could be combined to be used with the keyword embodiments. Different aspects and elements of the above described embodiments may be combined in a similar manner.

Having described several embodiments, it will be recognized by those of skill in the art that various modifications, alternative constructions, and equivalents may be used without departing from the spirit of the invention. Accordingly, the above description should not be taken as limiting the scope of the invention, which is defined in the following claims.

What is claimed is:

1. A system for mapping the location of a mobile communications device, which comprises:
   the mobile communications device configured to:
      receive a set of data identifying the location of the device;
      transmit the set of data;
      receive image data illustrating a map including the location of the device and locations of a selected subset of a plurality of other mobile communications devices; and
      display the image data on a screen coupled to the device;
   a mobile communications base station, in communication with the mobile communications device via a wireless connection; and
   a server computer system in communication with the base station, the server computer system configured to:
      maintain a user profile of a user of the device, the user profile including information about the device and preferences of the user specifying circumstances in which a location of each of the plurality of other mobile communications devices will be included in image data transmitted to the device, the user profile stored in a database of the server computer system;
      receive the set of data;
      associate the set of data with the user, and the user profile;
      receive an additional set of data identifying locations of the plurality of other mobile communications devices;
      create the image data including the location of the device and locations of the selected subset of the plurality of other mobile communications devices, wherein the selected subset is based at least in part on the preferences in the user profile, wherein the image data is formatted for display on the device and the format is determined from the information about the device; and
      transmit the image data to the device.

2. The system of claim 1, wherein the set of data comprises GPS coordinate data.

3. The system of claim 2, wherein the GPS coordinate data comprises GPS codes and a GPS navigation message.

4. The system of claim 1, wherein,
   the mobile communications device is further configured to transmit data which modifies the user profile; and
   the user profile may be modified by the user from the device.

5. The system of claim 1, wherein,
   the user profile includes preferences of the user specifying the circumstances in which a location of each of a plurality of businesses and other points of interest will be displayed in the image data; and
   the image data includes a graphical representation of a selection of the locations of the plurality of businesses and other points of interest, wherein the selection is based on preferences in the user profile.

6. The system of claim 5, wherein each of the selection are graphically represented as different icons in the image data, and the icons comprise hyperliniks to information about each of the selections.

7. The system of claim 1, wherein,
   the server computer system is further configured to store the set of data; and
   the image data includes a graphical representation of the historical locations of the device within a time period.

8. The system of claim 7, wherein the time period is specified in the user profile.

9. A method of transmitting an image to a mobile communications device from a server computer system, the method comprising:
   maintaining a user profile of a user of the mobile communications device, the user profile containing information about the device and preferences of the user specifying circumstances in which a location of each of a plurality of other mobile communications devices will be included in image data transmitted to the device, the information stored in a database of the server computer system;
   receiving a set of data identifying the location of the device transmitted from the device;
   associating the set of data with the user, and the user profile;
   receiving an additional set of data identifying locations of the plurality of other mobile communications devices;
   creating image data illustrating a map containing the location of the device and locations of a selected subset of the plurality of other mobile communications devices, wherein the selected subset is based at least in part on the preferences in the user profile, wherein the image data is formatted for display on the device and the format is determined from the information about the device; and
   transmitting the image data to the device.

10. The method of claim 9, wherein the mobile communications device comprises a cellular telephone.

11. The method of claim 9, wherein the set of data comprises GPS coordinate data.

12. The method of claim 11, wherein the GPS coordinate data comprises GPS codes and a GPS navigation message.

13. The method of claim 9, wherein,
   the user profile includes preferences of the user specifying the circumstances in which a location of each of a plurality of businesses and other points of interest will be displayed in the image data; and
   the image data includes a graphical representation of a selection of the locations of the plurality of businesses and other points of interest, wherein the selection is based on preferences in the user profile.

14. The method of claim 13, wherein each of the selection are graphically represented as different icons in the image data, and the icons comprise hyperliniks to information about each of the selections.

15. The method of claim 9, wherein, the receiving step further comprises storing the data which specifies the location of the device in a database; and the image data includes a graphical representation of historical locations of the device within a time period.

16. The method of claim 15, wherein the time period is specified in the user profile.

17. The method of claim 9, which further comprises receiving an additional set of data from the device identifying a second location, wherein the image data includes a graphical representation of the second location and a suggested route to the second location.

18. A computer program embodied on at least one computer readable medium, the computer program comprising instructions executable by a computer to:

create a user profile of a user of a mobile communications device, the user profile containing information about the device and preferences of the user specifying circumstances in which a location of each of a plurality of other mobile communications devices will be included in image data transmitted to the device;

receive a set of data identifying the location of the device transmitted from the device;

associate the set of data with the user, and the user profile;

receive an additional set of data identifying locations of the plurality of other mobile communications devices;

create image data illustrating a map containing the location of the device and locations of a selected subset of the plurality of other mobile communications devices, wherein the selected subset is based at least in part on the preferences in the user profile, wherein the image data is formatted for display on the device and the format is determined from the information about the device; and transmit the image data to the device.

19. The computer program recited in claim 18, which further comprises instructions executable to store the set of data in a database, wherein the image data includes a graphical representation of historical locations of the device within a time period.

20. The computer program recited in claim 18, which further comprises instructions executable to receive an additional set of data from the device identifying a second location, wherein the image data includes graphical representations of the second location and a suggested route to the second location.

21. A method for transmitting image data to a mobile communications device from a server computer system, the method comprising:

maintaining a user profile of a user of a mobile communications device, the user profile including preferences identifying circumstances in which a location of each of the plurality of other mobile communications devices will be included in image data transmitted to the device;

receiving a set of data identifying the location of the device, the received set of data based at least in part on information transmitted from the device;

receiving an additional set of data identifying locations of the plurality of other mobile communications devices;

generating image data illustrating a map containing the identified location of the device and the identified locations of a selected subset of the plurality of other mobile communications devices, wherein the selected subset is based at least in part on the preferences in the user profile and wherein the image data is formatted for display on the device; and transmitting the image data to the device.

22. The method of claim 21, wherein, the user profile further comprises preferences specifying the circumstances in which a location of each of a plurality of businesses and other points of interest will be displayed in the image data; and the image data further comprises a graphical representation of a selection of the locations of the plurality of businesses and other points of interest, wherein the selection is based on the preferences in the user profile for the plurality of businesses and other points of interest.

23. The method of claim 21, further comprising:

receiving an additional set of data identifying a second location, wherein the image data includes a graphical representation of the second location and a suggested route to the second location from the location of the device.

24. The method of claim 21, wherein the image data includes a graphical representation of historical locations of the device within a time period.

25. The method of claim 21, wherein at least some of the selected subset of locations are graphically represented as icons in the image data, and the icons comprise hyperlinks to information about a user of a respective other mobile communications device.

* * * * *

UNITED STATES PATENT AND TRADEMARK OFFICE
CERTIFICATE OF CORRECTION

| | | |
|---|---|---|
| PATENT NO. | : 7,259,668 B2 | Page 1 of 1 |
| APPLICATION NO. | : 11/180055 | |
| DATED | : August 21, 2007 | |
| INVENTOR(S) | : Steven M. Casey | |

It is certified that error appears in the above-identified patent and that said Letters Patent is hereby corrected as shown below:

Column 22, line 19, "hyperliniks" should be -- hyperlinks --.
Column 23, line 5, "hyperliniks" should be -- hyperlinks --.

Signed and Sealed this

Twenty-seventh Day of November, 2007

JON W. DUDAS
*Director of the United States Patent and Trademark Office*